US010318978B2

(12) United States Patent
Hamilton, II et al.

(10) Patent No.: US 10,318,978 B2
(45) Date of Patent: Jun. 11, 2019

(54) IMPLEMENTING COMPUTER INTERACTION RESPONSE TESTS (71) Applicant: International Business Machines Corporation, Armonk, NY (US)

(72) Inventors: Rick A. Hamilton, II, Charlottesville, VA (US); Mauro Marzorati, Lutz, FL (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 14/748,453

(22) Filed: Jun. 24, 2015

(65) Prior Publication Data

US 2015/0371253 A1 Dec. 24, 2015

Related U.S. Application Data (63) Continuation of application No. 13/070,065, filed on Mar. 23, 2011, now Pat. No. 9,105,034.

(51) Int. Cl.
*G06Q 30/02* (2012.01)
(52) U.S. Cl.
CPC ......... *G06Q 30/0217* (2013.01); *G06Q 30/02* (2013.01); *G06Q 30/0241* (2013.01);
(Continued)
(58) Field of Classification Search
CPC ............... G06Q 30/02; G06Q 30/0207; G06Q 30/0217; G06Q 30/0245; G06Q 30/0255; G06Q 30/0269
(Continued)

(56) References Cited

U.S. PATENT DOCUMENTS 5,086,460 A * 2/1992 Ash ...................... H04Q 3/0016
379/134
2002/0082067 A1* 6/2002 Mckay .................... A63F 9/183
463/9
(Continued)

FOREIGN PATENT DOCUMENTS

JP         2009163283 A      7/2009

OTHER PUBLICATIONS

Scott D. Gartland, USPTO Office Action, U.S. Appl. No. 13/070,065, dated Mar. 7, 2013, 22 pages.
(Continued)

*Primary Examiner* — Scott D Gartland
(74) *Attorney, Agent, or Firm* — William H. Hartwell; Hunter E. Webb; Keohane & D'Alessandro PLLC (57) ABSTRACT Embodiments of the present invention provide an approach for enhancing computer interaction challenge-response tests (e.g., Completely Automatic Public Turing Test to Tell Computers and Humans Apart, or CAPTCHA). Furthermore, embodiments of the present invention provide an approach for introducing advertising in such challenge-response tests, such that users are presented with opportunities to learn about or reinforce brands. In a typical embodiment, when a user attempts to access content (e.g., web content), the user will be presented with a CAPTCHA test. The CAPTCHA test typically includes an advertisement (e.g., logo, label, etc.) and an associated question for the user to answer. Along these lines, the advertisement is generally selected based on the user's demographics (e.g., interests, gender, age, etc.). If the user successfully responds to the question and/or responds within a certain amount of time, a reward can be determined (e.g., access to the content, preferred placement in a queue for computing resources, etc.). In one embodiment, a cumulative points total can be maintained for the user based on cumulative responses to
(Continued)

CAPTCHA tests. In this embodiment, the CAPTCHA tests presented to the user can have increasing levels of difficulty with corresponding rewards.

15 Claims, 8 Drawing Sheets

(52) U.S. Cl.
CPC ..... *G06Q 30/0245* (2013.01); *G06Q 30/0255* (2013.01); *G06Q 30/0269* (2013.01)

(58) Field of Classification Search
USPC ............ 705/14.1, 14.19, 14.44, 14.53, 14.66
See application file for complete search history.

(56) References Cited

U.S. PATENT DOCUMENTS

| | | | |
|---|---|---|---|
| 2002/0120504 A1* | 8/2002 | Gould | G06Q 30/02 705/14.2 |
| 2003/0103619 A1* | 6/2003 | Brown | H04M 3/523 379/266.01 |
| 2007/0033102 A1 | 2/2007 | Frank et al. | |
| 2008/0133321 A1* | 6/2008 | Pennock | G06Q 30/02 705/14.54 |
| 2008/0133347 A1 | 6/2008 | Josifovski et al. | |
| 2008/0133348 A1 | 6/2008 | Reed et al. | |
| 2008/0189768 A1 | 8/2008 | Callahan et al. | |
| 2009/0012855 A1 | 1/2009 | Jamal et al. | |
| 2009/0113294 A1 | 4/2009 | Sanghavi et al. | |
| 2009/0210937 A1 | 8/2009 | Kraft et al. | |
| 2009/0260068 A1 | 10/2009 | Hariharan et al. | |
| 2009/0319271 A1 | 12/2009 | Gross | |
| 2009/0328150 A1 | 12/2009 | Gross | |
| 2011/0029781 A1* | 2/2011 | Clark | G06F 21/31 713/182 |
| 2012/0124664 A1 | 5/2012 | Stein et al. | |

OTHER PUBLICATIONS

Scott D. Gartland, USPTO Final Office Action, U.S. Appl. No. 13/070,065, dated Aug. 15, 2013, 23 pages.

Scott D. Gartland, USPTO Notice of Allowance and Fee(s) Due, U.S. Appl. No. 13/070,065, dated Mar. 31, 2015, 9 pages.

Hiroshi Murakami, "Information Materials for IDS", JP Office Action dated Jul. 28, 2015, 4 pages.

* cited by examiner

FIG. 1

To receive an additional 10% off your next Acme purchase answer the question below:

Acme is headquartered in what City? ~66

Answer: ~68

IMPLEMENTING COMPUTER INTERACTION RESPONSE TESTS

CROSS-REFERENCE TO RELATED APPLICATIONS

The present patent document is a continuation of U.S. patent application Ser. No. 13/070,065, filed Mar. 23, 2011, entitled "IMPLEMENTING COMPUTER INTERACTION RESPONSE TESTS", the disclosure of which is incorporated herein by reference.

TECHNICAL FIELD

The present invention generally relates to computer interaction-response tests. Specifically, the present invention relates to the use of a Completely Automatic Public Turing Test to Tell Computers and Humans Apart (CAPTCHA) test to enhance brand recognition and determine user rewards.

BACKGROUND

Commercial advertisers generally seek to generate increased use of their products or services through branding, which may include the repetition of an image or product name in an effort to associate related qualities with the brand in the minds of consumers. Different types of media may be used to deliver these messages, including traditional media such as newspapers, magazines, television, radio, outdoor or direct mail, or newer media such as websites and text messages. A challenge for advertisers is to induce the audience to be attentive to advertisements. To that end, many strategies have been employed over the years in several different mediums.

A Completely Automatic Public Turing Test to Tell Computers and Humans Apart (CAPTCHA) is a type of challenge-response test used in computing to ensure that the response is not generated by a computer. The process usually requires one computer (a server) asking a user to complete a simple test which the computer is able to generate and assess. Because other computers are generally unable to solve the CAPTCHA, any user entering a correct solution is presumed to be human. Thus, it is sometimes described as a reverse Turing test, because it is administered by a machine and targeted to a human (in contrast to the standard Turing test that is typically administered by a human and targeted to a machine). A common type of CAPTCHA requires that the user type letters or digits from a distorted image that appears on a screen/display. Presently, CAPTCHAs involve engaging the user using random or pseudo-random word sets. As such, this time of user concentration is not being fully utilized by firms hosting web pages, and, by extension, their sponsors.

SUMMARY

Embodiments of the present invention provide an approach for enhancing computer interaction challenge-response tests (e.g., Completely Automatic Public Turing Test to Tell Computers and Humans Apart, or CAPTCHA). Furthermore, embodiments of the present invention provide an approach for introducing advertising in such challenge-response tests, such that users are presented with opportunities to learn about or reinforce brands. In a typical embodiment, when a user attempts to access content (e.g., web content), the user will be presented with a CAPTCHA test. The CAPTCHA test typically includes an advertisement (e.g., logo, label, etc.) and an associated question for the user to answer. Along these lines, the advertisement is generally selected based on the user's demographics (e.g., interests, gender, age, etc.). If the user successfully responds to the question and/or responds within a certain amount of time, a reward can be determined (e.g., access to the content, preferred placement in a queue for computing resources, etc.). In one embodiment, a cumulative points total can be maintained for the user based on cumulative responses to CAPTCHA tests. In this embodiment, the CAPTCHA tests presented to the user can have increasing levels of difficulty with corresponding rewards.

A first aspect of the present invention provides a computer-implemented method for implementing CAPTCHA tests, comprising: receiving a request to access content from a user; providing a CAPTCHA test to the user in response to the request, the CAPTCHA test comprising an advertisement and a question related to the advertisement; receiving a response to the question; and determining a reward for the user based on the response.

A second aspect of the present invention provides a system for implementing CAPTCHA tests, comprising: a bus; a processor coupled to the bus; and a memory medium coupled to the bus, the memory medium comprising instructions to: receive a request to access content from a user; provide a CAPTCHA test to the user in response to the request, the CAPTCHA test comprising an advertisement and a question related to the advertisement; receive a response to the question; and determine a reward for the user based on the response.

A third aspect of the present invention provides a computer program product for implementing CAPTCHA tests, the computer program product comprising a computer readable storage media, and program instructions stored on the computer readable storage media, to: receive a request to access content from a user; provide a CAPTCHA test to the user in response to the request, the CAPTCHA test comprising an advertisement and a question related to the advertisement; receive a response to the question; and determine a reward for the user based on the response.

A fourth aspect of the present invention provides a method for deploying a system for implementing CAPTCHA tests, comprising: deploying a computer infrastructure being operable to: receive a request to access content from a user; provide a CAPTCHA test to the user in response to the request, the CAPTCHA test comprising an advertisement and a question related to the advertisement; receive a response to the question; and determine a reward for the user based on the response.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments now will be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for enhancing computer interaction challenge-response tests (e.g., Completely Automatic Public Turing Test to Tell Computers and Humans Apart or CAPTCHA). Furthermore, embodiments of the present invention provide an approach for introducing advertising in such challenge-response tests, such that users are presented with opportunities to learn about or reinforce brands. In a typical embodiment, when a user attempts to access content (e.g., web content), the user will be presented with a CAPTCHA test. The CAPTCHA test typically includes an advertisement (e.g., logo, label, etc.) and an associated question for the user to answer. Along these lines, the advertisement is generally selected based on the user's demographics (e.g., interests, gender, age, etc.). If the user successfully responds to the question and/or responds within a certain amount of time, a reward can be determined (e.g., access to the content, preferred placement in a queue for computing resources, etc.). In one embodiment, a cumulative points total can be maintained for the user based on cumulative responses to CAPTCHA tests. In this embodiment, the CAPTCHA tests presented to the user can have an increasing level of difficulty with corresponding rewards.

Figure 1:
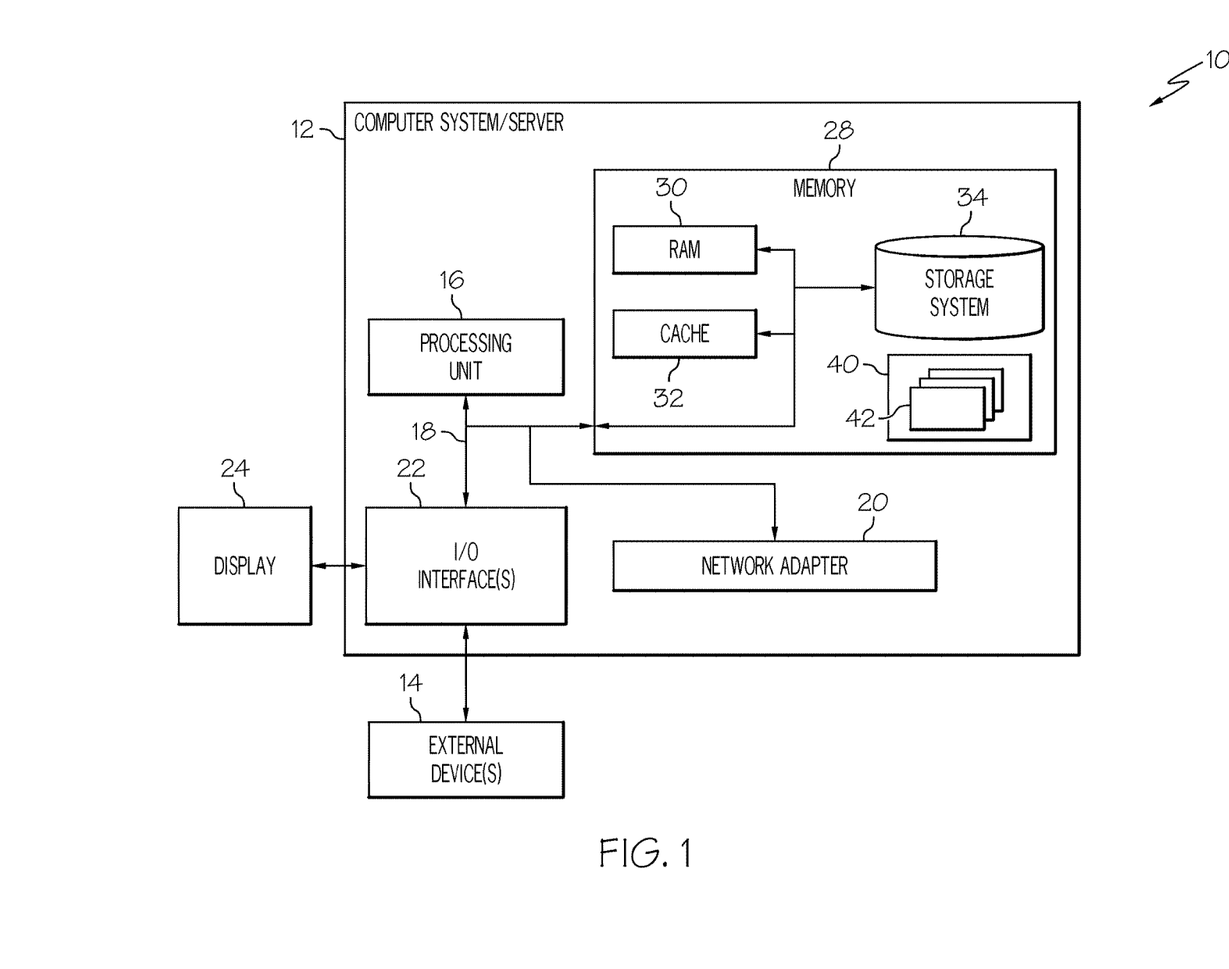
FIG. 1 depicts a computing node according to an embodiment of the present invention.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth herein (e.g., management component 50 of FIG. 2).

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

CAPTCHA test program/utility 40, having a set (at least one) of program modules 42, may be stored in memory 28 by way of example, and not limitation, as well as an operating system, one or more application programs, other program modules, and program data. In general, CAPTCHA test program 40 performs the function of the present invention as described herein. For example, CAPTCHA test program 40 can gather/organize user demographic data, gather/orgainize CAPTCHA data (e.g., advertising content), provide targeted CAPTCHA tests to users, determine user point totals, and determine rewards, etc. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
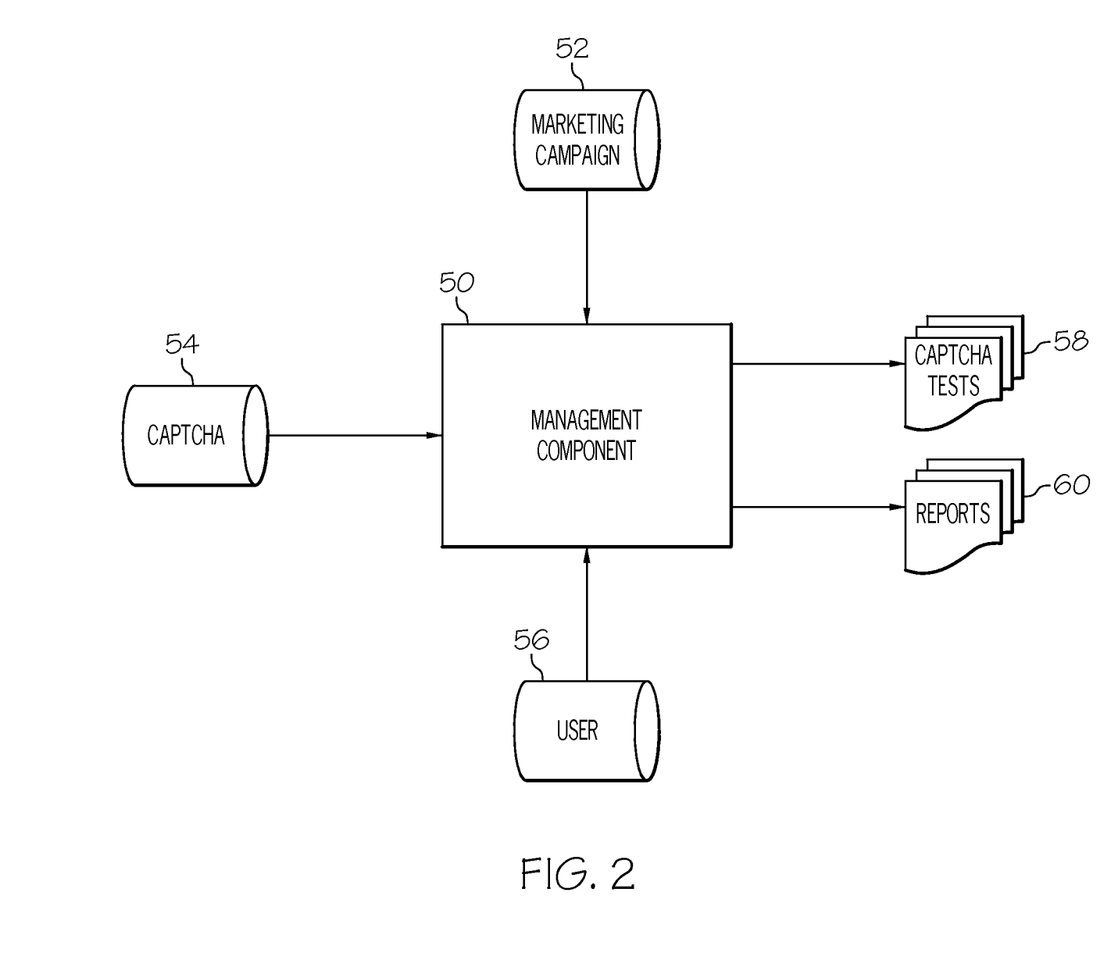
FIG. 2 depicts a component diagram according to an embodiment of the present invention.

Referring now to FIG. 2, a component diagram according to an embodiment of the present invention is shown. As depicted, this embodiment includes a management component 50, a marketing campaign database/component 52, a CAPTCHA database/component 54, and a user database/component 56. As will be further described below, management component 50 receives input in the form marketing data/advertisements, CAPTCHA data, and user demographics from these databases. Management component 50 will then generate a targeted CAPTCHA test 58 for a user requesting access to content. Specifically, the CAPTCHA test will comprise an advertisement tailored to the user's demographics and a question related to the advertisement. If the question is answered successfully and/or within a predetermined amount of time, a reward can be determined. Management component 50 can also generate one or more reports 60 related to the process, user point totals, the rewards generated, etc. Regardless, a more detailed description of the components shown in FIG. 2 will now be provided.

CAPTCHA management component 50: This component may be implemented as a computer program. In one embodiment, this component may be implemented as a WebSphere Application Server® (WAS®) application (WebSphere, WAS and related terms are trademarks of IBM Corp. in the United States and/or other countries), that can execute the business logic in a marketing campaign and deliver the defined CAPTCHAs to the appropriate users according to the methods described above. This component leverages the previously described components to deliver its functionality. The sample implementation described herein references the sample implementation described above and is not meant to limit the implementation choices for this component. The implementation of the CAPTCHA management component is directly affected by the implementation of the previously described components.

Marketing campaign component/database 52: This component is comprised of a collection of CAPTCHAs and business logic to govern the number of impressions for each user according to their respective type or other demographic data. The marketing campaign component/database 52 controls the actions of the CAPTCHA management component 50. Moreover, the marketing campaign component/database 52 may be an ensemble of IBM® DB/2® records (IBM, DB/2 and related terms are trademarks of IBM Corp. in the United States and/or other countries), DB/2® triggers, and Java User Defined Functions (UDFs) stored in a WAS application.

CAPTCHA Database Component 54: This component contains a set of CAPTCHAs for use in a marketing campaign. A reward value may be associated with each CAPTCHA test, wherein the reward value is proportional to the difficulty or required brand knowledge to successfully decipher it, the advertisement (e.g., an image, sound bite, copy-text or short video) typically being commercial promotional material educating the consumer through the correct answer for the test. This component comprises a database where information for these CAPTCHAs, along with their corresponding reward values and other attributes such as demographic data and difficulty level are stored. The database may be relational in nature, such as IBM® DB/2®.

User database component/database 56: This component contains a set of users and their demographic data, such as age, gender, place and type of dwelling, interests, etc. The records for these users carry a unique identifier, such as a telephone subscriber number or other value that can be stored in an electronic cookie, this component being the repository for known users of the system, along their brand knowledge level for each brand associated with a given marketing campaign. The database may be relational in nature, such as IBM® DB/2®. Of course, any demographic information can be provided on an "opt-in" basis and that also protects user privacy.

Figure 3:
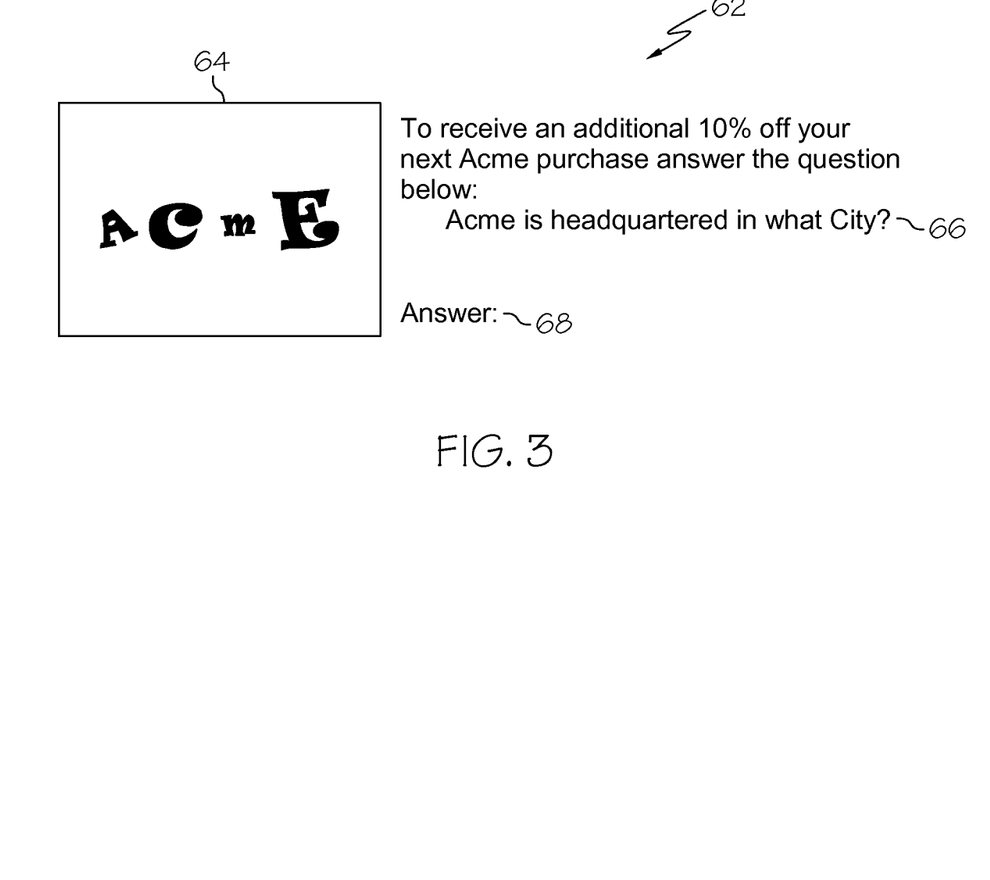
FIG. 3 depicts a CAPTCHA test according to an embodiment of the present invention.

Referring now to FIG. 3, an illustrative CAPTCHA test (test 62) according to an embodiment of the present invention is shown. As depicted, test 62 comprises an advertisement 64 in the form of a CAPTCHA and a related question 66 for which the user can input a response in area 68. The advertisement is for a brand name "ACME", and question 66 asks in what city ACME is headquartered. Typically, test 62 will be generated and displayed for a user pursuant to the user's request for content, access to a network location, etc. Along these lines, the brand/advertisement 64 displayed in test 62 is selected pursuant to the user's demographic information (e.g., age, gender, interests, etc.). As such, test 62 will be customized for the user. If the user answers correctly (optionally within a certain amount of time), a reward can be determined (e.g., access to the requested content, preferred placement in a queue for computing resources, etc.) Moreover, management component 50 (FIG. 2) can assign points for correct answers. Along these lines, a cumulative point total can be maintained for each user. Points can be added or deducted from the total based upon correct or incorrect responses. Along these lines, test 62 can be implemented in a hierarchical fashion whereby questions have varying (e.g., increasing) levels of difficulty (e.g., based upon succession, what is being requested by the user, etc.). The points awarded/deducted as well as the corresponding rewards can vary commensurately with the difficulty of the questions.

Upon first interaction with the user, the system may display a CAPTCHA with a low weight or reward level. During interaction and/or upon successful completion of test 62, the system may perform two actions: (1) issues a unique identifier to the user; and/or (2) entitles the consumer to a level of access to the requested media commensurate with the reward level of the solved CAPTCHA, the level of access being measured in a number of ways, some of which may be an amount of time for which the requested media will play, specific portions of a web site, preferential placement in a queue, etc.

Time-based access level method: In this method, the level of access is measured by time. Upon expiration of the allotted time, the system will once again present a new CAPTCHA test to the user. This successive challenge could be of comparable difficulty, or it may have a higher difficulty, whereupon successful completion will continue the media presentation for a lengthier period of time than before, commensurate with the amount of points accumulated by the user. In case of unsuccessful completion of the test, or in the case where the consumer elects to not solve the test, the system may then present to the consumer an advertisement impression containing the answer to the test. In the case of successful resolution of the test, points are awarded to the users, whereas points are deducted in the case where the user selects to forego. Unsuccessful resolution might optionally neither add, nor subtract, points. Each marketing campaign may associate a different conversion factor for points into length of time.

Placement-based access level method: In this method, the level of access is measured by different portions of web sites, and the system will present CAPTCHA tests to the user until such a time as the required points have been attained to access the specific portion of the website being requested. Points are awarded or deducted similarly to the previous method. Each portion of a web site may have a specific minimum point value required for access. Portions of the website could be access to high-quality streaming audio/video versus low-quality streaming audio/video portions. In computer-based implementations such as web sites or streamed video/audio playback, users may have corresponding with mechanisms associated with the specific marketing campaign. The point values may, in a typical embodiment, be stored in the system side and not in the consumer computing devices. Some implementations may "pre-seed" the community through the transfer of points earned by users in a previous marketing campaign into another newly created campaign. For this pre-seeding method, returning computer users are identified by their possession of any of the previous marketing campaigns' persistent cookies. In this case, the transfer of the points is done on demand upon first interaction with the new marketing campaign.

Queue-based access level method: In this method, the level of access is measured by preferential placement in a queue, such as users accessing a computing resource with limited capacity such as an online game or an online radio station. Returning users are presented with a CAPTCHA test commensurate with the point level attained by the user. Upon successful completion, the additional points are awarded, and the user is placed into the corresponding location in the servicing queue, whereas unsuccessful completion or foregoing the option to solve the test will result in zero points being awarded and direct placement in the default location in the servicing queue (i.e., the back of the line).

Some queue-based access methods will implement the priority queue mechanism with well-known resource pool allocations such as job entry sub-system (JES2) job class initiators, while others may perform well-known priority queue insertion methods.

Process Flow Diagrams

Figure 4:
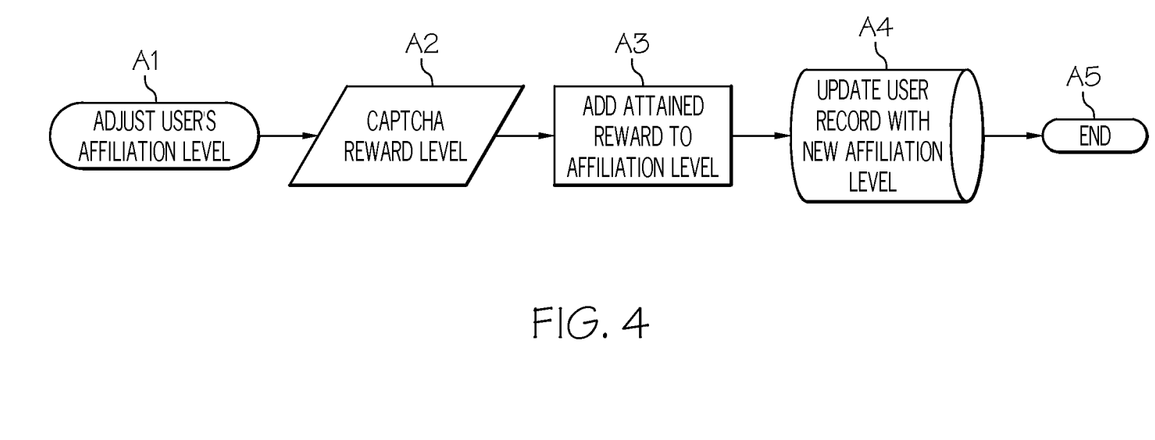
FIG. 4 depicts a process flow diagram according to an embodiment of the present invention.

FIGS. 4-7 depict the process by which different operations implemented hereunder are performed. Referring first to FIG. 4, a process flow diagram for altering the user component/database 56 (FIG. 2) is shown. In general, the response resulting from the display of a CAPTCHA to a user, selected in accordance to the parameters expressed in the marketing campaign, results in a record update in the user database/component 56, such as an update to the attained points of the user on the given campaign. If the change causes the data record to meet certain conditions, such as promotion to a higher level of rewards as described in the campaign, the database trigger will invoke the Java UDF stored in the WAS application. The Java UDF executes the increased reward level for the user in question, depending on the type of access method that is being employed by the marketing campaign.

As shown, the process begins in step A1. In step A2, the CAPTCHA reward level is adjusted. In step A3, the reward attained is added to the user's affiliation level. In step A4, the user's record is updated with the new affiliation level and the process is ended in step A5.

Figure 5A:
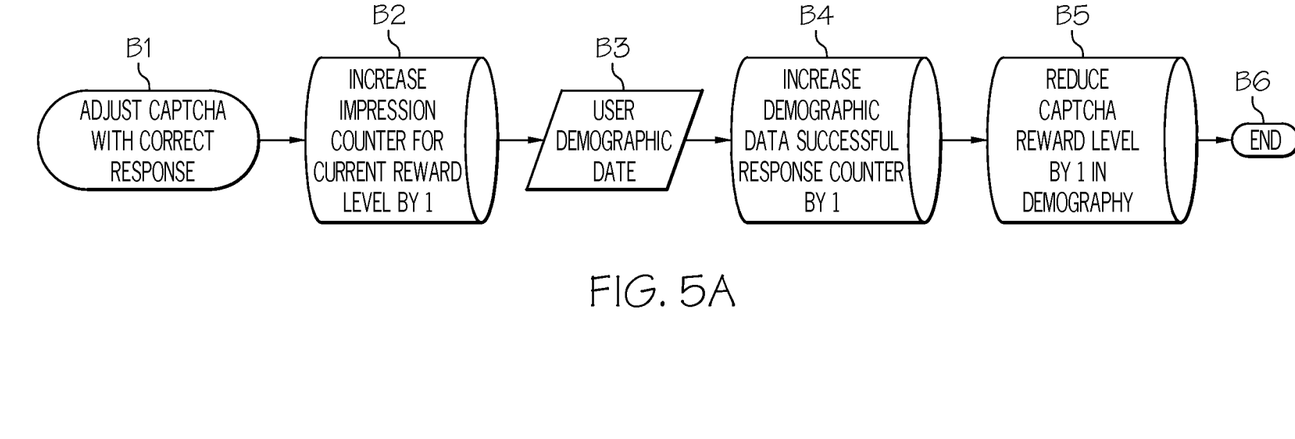
FIG. 5A depicts another process flow diagram according to an embodiment of the present invention.
Figure 5B:
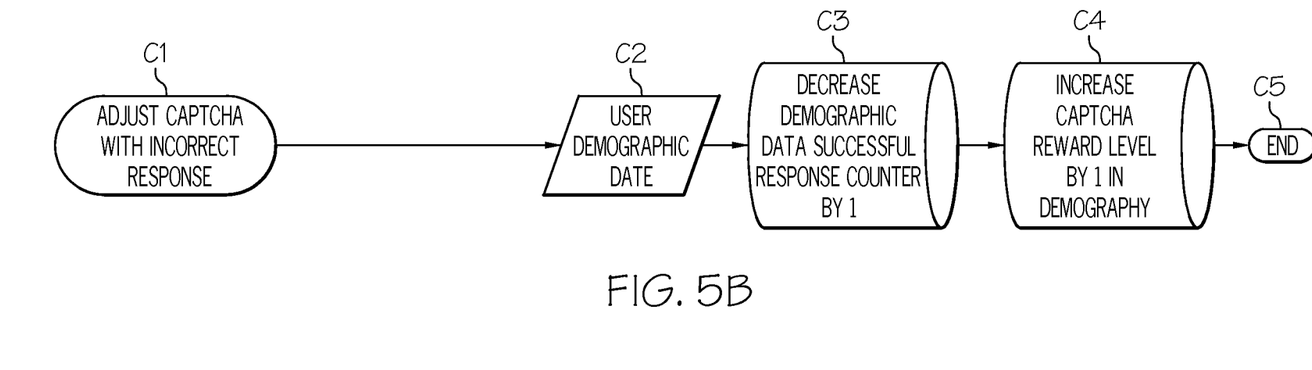
FIG. 5B depicts another process flow diagram according to an embodiment of the present invention.

FIG. 5 depicts a process flow diagram for altering the CAPTCHA database component. In general, the response resulting from the display of a CAPTCHA test to a user, selected in accordance with the parameters expressed in the marketing campaign, results in a record update in the CAPTCHA database component, such as an update to the reward level for the CAPTCHA in question. Such an event happens when the distribution of correct and incorrect responses to the CAPTCHA fall outside statistical boundary parameters, such as standard deviation or variance. The record update will cause a database trigger to be issued and an invocation of a Java UDF. The execution of the UDF may, depending on the implementation, cause a number of actions such as: (1) an alert to be issued to the campaign operator; (2) the automatic adjustment of the reward value associated with the CAPTCHA to reflect the true difficulty level for the given demographic; and/or (3) the automatic adjustment of the demographic data associated with the CAPTCHA to cause the presentment conditions to users to be varied.

FIG. 5 shows two scenarios, steps B1-6 for a correct user response, steps C1-5 for an incorrect response. In step B1, the process for the CAPTCHA is being adjusted when a correct response begins. In step B2, an impression counter is increased for a current reward by "1". In step B3, user demographic data is accessed. In step B4, a demographic data successful response counter is increased by "1". In step B5, a CAPTCHA reward level is reduced by "1" in demography before the process is ended in step B6. In step C1, the process for the CAPTCHA is being adjusted when an incorrect response begins. In step C2, user demographic data is accessed. In step C3, a demographic data successful response counter is decreased by "1". In step C4, the CAPTCHA reward level is increased by "1" in demography before the process is ended in step C5.

Figure 6:
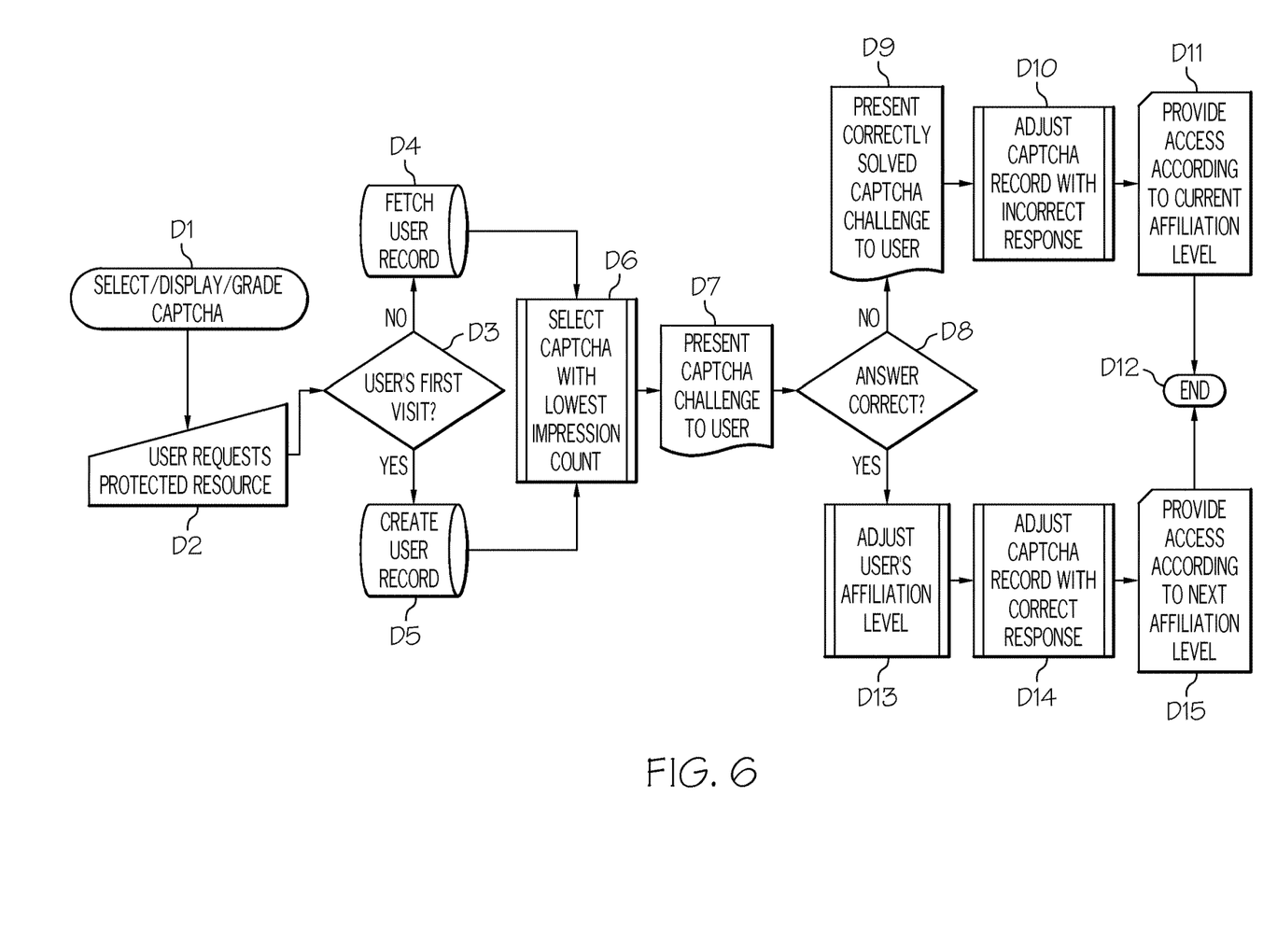
FIG. 6 depicts another process flow diagram according to an embodiment of the present invention.

FIG. 6 depicts a process flow diagram for selecting, displaying, and/or grading/assessing CAPTCHA tests. In general, in response to a user request for interaction, the CAPTCHA management component selects a CAPTCHA from the CAPTCHA database, optionally matching the user's demographic data, difficulty level, and frequency parameters described in the marketing campaign. The CAPTCHA test can be delivered via well-known web methods according to the type of test (fill-in-the-blank copy text, textual question/response, image recognition, audio jingle recognition, etc.) to the user. The user response is likewise received via well known web methods, such as an HTTP POST operation, by the application. The supplied response is assessed or graded against the stored response in the database and the record updated to reflect the amount of correct/incorrect responses by the user's demography via the alter CAPTCHA database routine described above. The user database component routine is also similarly called. Finally, the access to the controlled resource is processed according to the type of access method being employed.

As shown in FIG. 6, the process begins in step D1. In step D2, the user requests a requested resource/content. In step D3, it is determined whether it is the user's first visit to the requested resource. If not, the user's record for accessing that content is fetched in step D4. If so, a new user record is created for the requested content in step D5. In step D6, a CAPTCHA test with a lowest impression count is selected. In step D7, a CAPTCHA test is presented to the user. In step D8, it is determined whether the user responded correctly. If not, the correct response is presented to the user in step D9, and the CAPTCHA record is adjusted to reflect the incorrect response in step D10. Access is then provided to the user according to his/her current affiliation level in step D11 before the process ends in step D12. If however, the user answered correctly in step D8, the user's affiliation level is adjusted (e.g., improved) in step D13, the CAPTCHA record is adjusted to reflect the correct response in step D14, and access is provided at a next affiliation level in step D15 before the process is ended in step D12.

Figure 7:
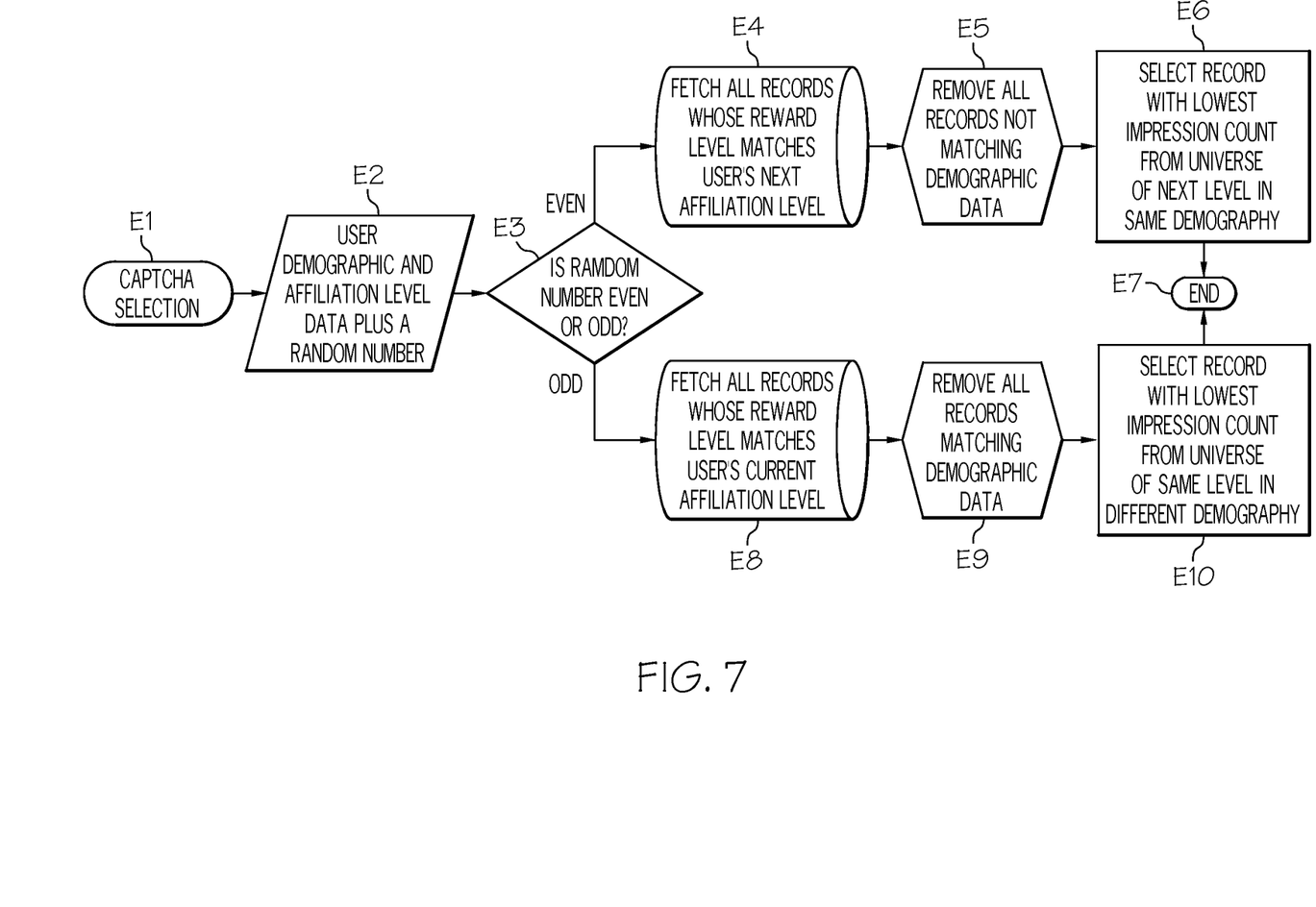
FIG. 7 depicts another process flow diagram according to an embodiment of the present invention.

FIG. 7 depicts a process flow diagram for CAPTCHA test selection. Before detailing the CAPTCHA selection algorithm, it is noted that this approach may be used to provide access to any restricted or desirable function, such as access to desirable media and/or signing up for various features and functions. It is also noted that this approach can keep track of a user's previous uses and thus provide a progressive or staged CAPTCHA presentation. For example, if the CAPTCHA consisted, in part, of a 7-second multimedia ad, then the next time the user is presented with a CAPTCHA, the multimedia ad may continue from where it left off. Note also that informative reports may be generated based on CAPTCHA use, and a third-party service may be used to generate such reports. For example, a report may contain information on familiarity with certain products according to region of the country. Advertisers may make use of these reports for market research. The CAPTCHA selection mechanism is useful to ensure an even and effective distribution of all the CAPTCHAs to the entirety of the population. Presenting the CAPTCHAs to the widest audience ensures that over time the measured resolution correctly reflects the true difficulty of a given CAPTCHA for a given demography. As an example, an older demography may find CAPTCHAs referencing musical jingles during the time period of their youth to be easier than a younger demography. In this case, the younger user correctly resolving the CAPTCHA challenge should be afforded a greater reward. In other words, for example, when assessing "difficulty level" or "level of comprehensiveness" with respect to a CAPTCHA challenge, the selection algorithm may be used to determine and modify rewards (e.g., points) based on a changing assessment through time. Still yet, the concept of "comprehensiveness" may be useful for an advertiser. As an example, a CAPTCHA that assesses a user's familiarity with the entire product line for a soda company may be considered more "comprehensive" than a CAPTCHA concerning just one product in a product line. To this end, the CAPTCHA selection algorithm ensures the widest possible audience by alternatively presenting more challenging CAPTCHAs to a narrower demography and equally challenging CAPTCHAs to a wider demography.

In FIG. 7, the process begins in step E1, and in step E2, a user demographic and affiliation level plus a random number are gathered. In step E3, it is determined whether the number is even or odd. If even, all records for whose reward level matches the user's next affiliation level are fetched in step E4. In step E5, all records not matching the user's demographic data are removed. In step E6, a record with a lowest impression count is selected from the next level in the same demography before the process is ended in step E7. If the random number was determined to be off in step E3, all records for whose reward level matches the user's current affiliation level are fetched in step E8. In step E9, all records matching the user's demographic data are removed. In step E10, a record with a lowest impression count is selected from the same level in a different demography before the process is ended in step E7.

Illustrative Example

A sample set of steps suggests one approach for CAPTCHA selection:
1. Present CAPTCHA test based on user demographic information and past user responses
2. Record user response
3. Assess difficulty level
4. Assess reward (e.g., points)
5. Generate report for market research (e.g., for advertiser)
6. Go to Step 1

In Step 1, for example, the system determines that a user is from location "X" and has never used the CAPTCHA system. The user is presented with a simple advertisement related to a soft drink, such as, "What is the name of the soda you see in the CAPTCHA?" This question may be deemed to be easy since the soft drink brand may actually be seen on the image of the bottle. In Step 2, the user response is recorded. If, for example, 500 of 510 exposures of the CAPTCHA are correct for this demographic, this CAPTCHA question may be considered to be easy in Step 3 and the reward in Step 4 may be 10 points. The next time the user is presented with a CAPTCHA in step 1, this ad may be presented again if the user had difficulty with it in the past, or, alternatively, an "easier" CAPTCHA may be presented.

Note that if the user cannot properly respond to the CAPTCHA in step 1 and 2, the user may actually be willing to spend a minute of research so that he/she can supply an answer. For example, perhaps by using an Internet search engine to find out information on a product, this will enable the user to find the correct answer. In turn, the advertiser is happy because the user is made more familiar with the product.

Various algorithms may be used to assess difficulty D, such as:

$$D=R(d,u,n)+a(t)$$

where D is difficulty and R(d,u,n) is a measure of the aggregate response per demographic "d", particular user "u", and number of times "n" in the CAPTCHA is presented. The variable "a" may be set by the advertiser, service provider, or third party to alter the difficulty rating in a desirable way for a time period "t". For example, perhaps as part of a promotional advertisement, the advertiser or product manufacturer wishes to increase the difficulty rating (giving the user more points for a correct answer) during a particular period of time t. The period of time t may correspond to any of: holidays, day of week, time of day, market values, product inventory levels, activity of competitors, etc.

It is noted that that CAPTCHAs may be presented in any standard Internet settings, in video games, in virtual universes, on smart phones, etc. For example, CAPTCHAs may be presented in audio form on car radios in which a user cannot access a particular channel or part of a broadcast until, for example, answering a simple question. The simple response may be determined using known speech recognition methods. If desirable for safety reasons, the radio CAPTCHA need not be presented until the car is stopped or travelling below a certain speed, or when only a car passenger may be required to answer (as determined by directionality of voice response). Also, a CAPTCHA override feature may be presented so that a user, for example, can select a button that, in effect, indicates that he is not ready for a CAPTCHA at this point in time.

In implementations where CAPTCHAs are used in connection with a time-based access level, a player component is required to present CAPTCHAs to the user at the prescribed frequencies. The player component is a computer program that is able to receive and execute directives from the CAPTCHA management component while also being able to play different types of digital media.

Figure 8:
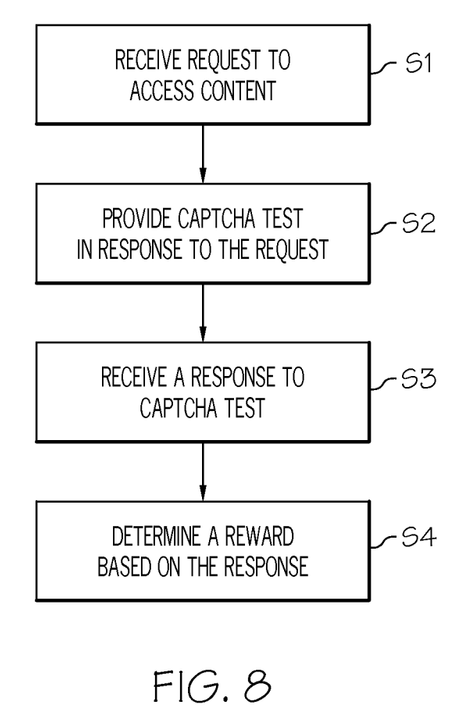
FIG. 8 depicts a method flow diagram according to an embodiment of the present invention.

Referring now to FIG. 8, a method flow diagram according to an embodiment of the present invention is shown. In step S1, a request to access content is received from a user. In step S2, a CAPTCHA test is provided to the user in response to the request. As discussed above, the CAPTCHA test comprises an (at least one) advertisement and a question related to the advertisement. In step S3, a response is received to the question. In step S4, a reward for the user is determined based on the response.

While shown and described herein as a CAPTCHA test solution, it is understood that the invention further provides various alternative embodiments. For example, in one embodiment, the invention provides a computer-readable/useable medium that includes computer program code to enable a computer infrastructure to provide CAPTCHA test functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide CAPTCHA test functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for CAPTCHA testing. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for ensuring that a request to access content is generated by a human user, comprising:
    receiving the request to access content from a user; selecting a random number;
    if the random number is odd, selecting a CAPTCHA test of a first reward level that corresponds to a point total associated with the user;
    if the random number is even, selecting a CAPTCHA test of a second reward level that is one level higher than a level that corresponds to a point total associated with the user wherein the first reward level is relatively lower than the second reward level, the selected CAPTCHA test comprises an advertisement and a first question related to the advertisement;
    receiving a response to the first question;
    adding at least one point to the point total associated with the user and determining a first reward for the user based on the point total when the response is the correct answer to the first question;
    denying access to the content and subtracting at least one point from the point total when the response is not the correct answer to the first question;
    receiving a subsequent request to access content from the user;
    providing an additional CAPTCHA test to the user in response to the subsequent request, the additional CAPTCHA test comprising a second advertisement and a second question related to the second advertisement, wherein the second question is of a greater difficulty level as compared to the first question;
    receiving a response to the second question;
    denying access to the content and subtracting at least one point from the point total, when the response to the second question is the incorrect answer to the second question, to produce an updated point total; and
    adding at least one point to the point total associated with the user to produce an updated point total and determining a second reward for the user based on the updated point total when the response is the correct answer to the second question, the second reward being of a greater value than the first reward, wherein the second reward is a preferential slot in a queue, and wherein the first reward is a slot in the queue behind the preferential slot, and wherein the queue is a line for access to content that has limited access capacity.

2. The method of claim 1, the determining a reward comprising granting a level of access to the content for the user based on an elapsed time for the user to input the response.

3. The method of claim 1, the determining a reward comprising granting a level of access to the content for the user based on a point level attained by the user by the response and at least one previous response.

4. The method of claim 1, the determining a reward comprising granting a preferred queue position to the user for accessing computing resources based on the response.

5. The method of claim 1, the additional question having a higher level of difficulty rating than the difficulty rating of the question.

6. A system for ensuring that a request to access content is generated by a human user, comprising:
    a bus;
    a processor coupled to the bus; and
    a memory medium coupled to the bus, the memory medium comprising instructions to:
    receive the request to access content from a user; select a random;
    if the random number is odd, selecting a CAPTCHA test of a first reward level that corresponds to a point total associated with the user;
    if the random number is even, selecting a CAPTCHA test of a second reward level that is one level higher than a level that corresponds to a point total associated with the user wherein the first reward level and is relatively lower than the second reward level, the selected CAPTCHA test comprises an advertisement and a first question related to the advertisement;
    receive a response to the first question;
    add at least one point to the point total associated with the user and determine a first reward for the user based on the point total when the response is the correct answer to the first question;
    deny access to the content and subtracting at least one point from the point total when the response is not the correct answer to the first question;
    receive a subsequent request to access content from the user; and
    provide an additional CAPTCHA test to the user in response to the subsequent request, the additional CAPTCHA test comprising a second advertisement and a second question related to the second advertisement, wherein the second question is of a greater difficulty level as compared to the first question;
    receive a response to the second question;
    deny access to the content and subtract at least one point from the point total, when the response to the second question is the incorrect answer to the second question, to produce an updated point total; and
    adding at least one point to the point total associated with the user to produce an updated point total and determining a second reward for the user based on the updated point total when the response is the correct answer to the second question, the second reward being of a greater value than the first reward, wherein the second reward is a preferential slot in a queue, and wherein the first reward is a slot in the queue behind the preferential slot, and wherein the queue is a line for access to content that has limited access capacity.

7. The system of claim 6, wherein the reward is determined based on an elapsed time for the user to input the response.

8. The system of claim 6,
wherein the reward is determined based on a point level attained by the user by the response and at least one previous response.

9. The system of claim 6
wherein the reward comprises a preferred queue position to the user for accessing computing resources based on the response.

10. The system of claim 6, the additional question having a difficulty rating higher than the difficulty rating of the question.

11. A computer program product ensuring that a request to access content is generated by a human user, the computer program product comprising a computer readable storage media, and program instructions stored on the computer readable storage media, to:
receive the request to access content from a user;
select a random number
if the random number is odd, selecting a CAPTCHA test of a first reward level that corresponds to a point total associated with the user;
if the random number is even, selecting a CAPTCHA test of a second reward level that is one level higher than a level that corresponds to a point total associated with the user wherein the first reward level is relatively lower than the second reward level, the selected CAPTCHA test comprises an advertisement and a first question related to the advertisement;
receive a response to the first question;
add at least one point to the point total associated with the user and determining a first reward for the user based on the point total when the response is the correct answer to the first question;
deny access to the content and subtracting at least one point from the point total when the response is not the correct answer to the first question;
receive a subsequent request to access content from the user; and
provide an additional CAPTCHA test to the user in response to the subsequent request, the additional CAPTCHA test comprising a second advertisement and a second question related to the second advertisement, wherein the second question is of a greater difficulty level as compared to the first question;
receive a response to the second question;
deny access to the content and subtract at least one point from the point total, when the response to the second question is the incorrect answer to the second question, to produce an updated point total; and
add at least one point to the point total associated with the user to produce an updated point total and determining a second reward for the user based on the updated point total when the response is the correct answer to the second question, the second reward being of a greater value than the first reward, wherein the second reward is a preferential slot in a queue, and wherein the first reward is a slot in the queue behind the preferential slot, and wherein the queue is a line for access to content that has limited access capacity.

12. The computer program product of claim 11, wherein the reward is determined based on an elapsed time for the user to input the response.

13. The computer program product of claim 11, wherein the reward is determined based on a point level attained by the user by the response and at least one previous response.

14. The computer program product of claim 11, the reward comprises a preferred queue position to the user for accessing computing resources based on the response.

15. The computer program product of claim 11, the additional question having a difficult rating higher than the difficulty rating of the question.

* * * * *